F. O. JAQUES, Jr.
SPRING TENSION NUT.
APPLICATION FILED SEPT. 3, 1919.
1,326,598.
Patented Dec. 30, 1919.
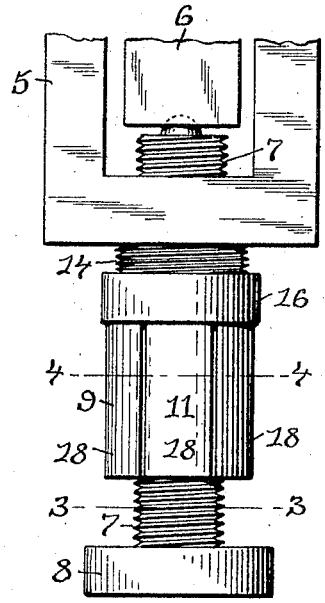
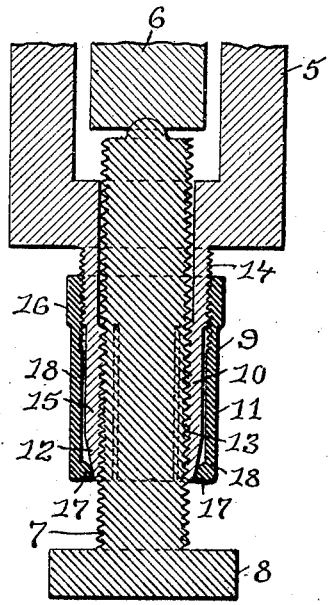
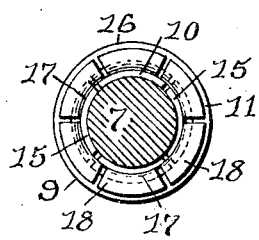
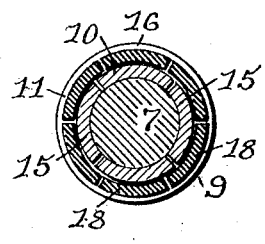
INVENTOR:
Fernando Oscar Jaques, Jr.,
by Chas. H. Luther
ATTORNEY.

UNITED STATES PATENT OFFICE.

FERNANDO OSCAR JAQUES, JR., OF PROVIDENCE, RHODE ISLAND.

SPRING-TENSION NUT.

1,326,598.  Specification of Letters Patent.  Patented Dec. 30, 1919.

Application filed September 3, 1919. Serial No. 321,417.

*To all whom it may concern:*

Be it known that I, FERNANDO OSCAR JAQUES, Jr., a citizen of the United States, residing at Providence, in the county of Providence and State of Rhode Island, have invented a new and useful Improvement in Spring-Tensioned Nuts, of which the following is a specification.

In the usual construction of nuts used on screw-threaded members of instruments of precision, the nuts are rigid relative to the screw-threads, and this is so even in nuts that are adjustable for wear, as the means for adjusting holds the nut rigid, after adjustment. As no screw-thread can be made absolutely perfect or accurate, such nuts will have an inaccurate movement, due to the inaccuracy of the screw-threads or the screw-threaded member will have an inaccurate movement in the nut due to the same cause, also the metal forming the screw-threads of the nut and particularly the metal forming the screw threads of the screw-threaded member in the nut, is usually soft or hard in places, thereby causing uneven wear on the threads and heretofore, so far as known, there has been no means in the nut for automatically taking up or compensating for this uneven wear on the screw-threads.

The object of my invention is to improve the construction of a spring tension nut, whereby all of the above objectionable features are eliminated and a more perfect spring tension nut for instruments of precision produced, than has heretofore been done.

A further object of my invention is to construct such a spring tension nut so that the spring tension of the nut on the screw-threaded member may be varied at will.

My invention consists in the peculiar and novel construction of a spring tension nut for instruments of precision, said spring tension nut having details of construction, as will be more fully set forth hereinafter and claimed.

Figure 1 is a face view of part of an instrument of precision, such as a telescope, microscope or the like, provided with my improved spring tension nut.

Fig. 2 is a longitudinal sectional view through Fig. 1.

Fig. 3 is a transverse sectional view through the screw, taken on line 3.3 of Fig. 1 and Fig. 4 is a transverse sectional view through the nut taken on line 4—4 of Fig. 1.

In the drawings 5 indicates the relatively fixed member of a telescope, 6 a movable part, 7 an adjusting screw engaging with the part 6 and having a knurled head 8 and 9 my improved spring tension nut.

The spring tension nut 9 consists principally of an internal member 10 and an external member 11. The internal member 10 is in the form of a spring collar formed preferably integral with the fixed member 5 from which it extends; it is constructed to have an externally beveled end 12, internal screw-threads 13 in screw-thread engagement with the screw 7, external screw-threads 14 at the fixed end and is split lengthwise into preferably four equal parts forming spring arms 15.15, as shown in broken lines in Fig. 2 and in full lines in Figs. 3 and 4 and which are in spring engagement with the screw 7.

The external member 11 is in the form of a spring sleeve which fits over the internal member 10; it is constructed to have an internally screw-thread base 16 in screw-threaded engagement with the screw-theads 14 on the internal member 10, an internal annular lip 17 at the end and engaging with the beveled end 12 of the internal member 10 and is split lengthwise into preferably six equal parts, forming spring arms 18.18 as shown in Figs. 1, 3 and 4 and which are in spring engagement with the spring arms 15.15 on the internal member, through the lip 17 and beveled end 12.

By this construction the initial tension of the spring arms 15.15 and 18.18 may be varied by increasing or decreasing the thickness of the arms relative to each other and each of the spring arms 18.18 has a portion of the internal lip 17 engaging with the beveled end 12 on the internal member 10.

When in use it is required to accurately raise or lower the movable part 6 with the least possible amount of friction and with no lost motion in the screw-threads at any part of the screw-threads. This I accomplish by the use of my improved spring tension nut. In raising or lowering the movable part 6 by turning the screw 7, the screw-threads 13 on the member 10 engaging with the threads on the screw 7, follows with the least amount of friction, any irregularities or worn places in the screw-threads, through the spring tension of the spring arms 15.15 and 18.18 and this spring tension on the screw-threads may be varied at will, by turning the external member 11 on the internal member 10, the spring arms 18.18 then bearing with more or less spring pressure on the spring arms 15.15, through the internal lip 17 on the beveled end 12 of the internal member 10, which forms the nut proper.

It is evident that my improved spring tension nut could be applied to any instrument of precision having a screw and nut and that the details of construction could be varied within the scope of the appended claims.

Having thus described my invention, I claim as new:—

1. A spring tension nut comprising an internally screw-threaded member having a plurality of arms and an external member having a plurality of arms engaging with the arms on the internally screw-threaded member.

2. A spring tension nut comprising an internal member having a plurality of screw-threaded arms and an external member having a plurality of arms engaging with the arms on the internal member.

3. A spring tension nut comprising an internal member having a plurality of screw-threaded spring arms and an external member having a plurality of spring arms engaging with the spring arms on the internal member.

4. A spring tension nut comprising an internal member having a plurality of screw-threaded arms with beveled ends and an external member having a plurality of spring arms engaging with the beveled ends of the arms on the internal member.

5. A spring tension nut comprising an internal member having a plurality of screw-threaded arms with beveled ends and forming the nut proper, an external member having a plurality of spring arms the ends of which engage with the beveled ends of the arms on the internal member.

6. A spring tension nut comprising an internal member having a plurality of screw-threaded arms with externally beveled ends, said arms forming the nut proper, an external member having a plurality of spring arms the ends of which engage with the beveled ends of the arms on the internal member and means for adjustably securing the external member to the internal member.

7. A spring tension nut comprising an internal collar member having a plurality of screw-threaded arms with externally beveled ends, said arms forming the nut proper, external screw-threads on the collar, an external sleeve member having a plurality of spring arms, the ends of the arms having lips engaging with the beveled ends of the arms on the internal member, said external sleeve having internal screw-threads in screw-thread engagement with the external screw-threads on the internal collar member, for the purpose as described.

In testimony whereof, I have signed my name to this specification.

FERNANDO OSCAR JAQUES, Jr.